US012370799B2

(12) United States Patent
Masuda

(10) Patent No.: US 12,370,799 B2
(45) Date of Patent: Jul. 29, 2025

(54) MAINTENANCE APPARATUS AND IMAGE RECORDING APPARATUS

(71) Applicant: BROTHER KOGYO KABUSHIKI KAISHA, Nagoya (JP)

(72) Inventor: Takehiro Masuda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 108 days.

(21) Appl. No.: 18/182,826

(22) Filed: Mar. 13, 2023

(65) Prior Publication Data

US 2023/0294408 A1 Sep. 21, 2023

(30) Foreign Application Priority Data

Mar. 15, 2022 (JP) ................................ 2022-039825

(51) Int. Cl.
*B41J 2/165* (2006.01)

(52) U.S. Cl.
CPC ......... *B41J 2/16535* (2013.01); *B41J 2/1652* (2013.01)

(58) Field of Classification Search
CPC .. B41J 2/16535; B41J 2/1652; B41J 2/16514; B41J 2/16517; B41J 2/16552; B41J 2/16526; B41J 2/16532; B41J 2002/16558; B41J 2/16538; B41J 2/16541; B41J 2/16508
USPC ............................................................ 347/31
See application file for complete search history.

(56) References Cited

U.S. PATENT DOCUMENTS

2004/0104961 A1* 6/2004 Hashi .................. B41J 2/16544 347/29
2007/0097170 A1* 5/2007 Sekiya ................ B41J 2/16508 347/30
2008/0259117 A1 10/2008 Takada
2015/0336386 A1* 11/2015 Shimazu ................ B41J 29/13 347/30

(Continued)

FOREIGN PATENT DOCUMENTS

EP 3 960 470 A2 3/2022
JP 2007-144696 A 6/2007
JP 2007-320173 A 12/2007

(Continued)

OTHER PUBLICATIONS

European Patent Office, Extended European Search Report issued in European Patent Application No. EP 23161282.1, mailed Nov. 3, 2023.

(Continued)

*Primary Examiner* — Jason S Uhlenhake
*Assistant Examiner* — Alexander D Shenderov
(74) *Attorney, Agent, or Firm* — Baker Botts L.L.P.

(57) ABSTRACT

There is provided a maintenance apparatus for an image recording apparatus provided with a head having a nozzle configured to discharge a liquid. The maintenance apparatus includes: a foam configured to absorb the liquid discharged from the nozzle; and an accommodating box which is opened upwardly and which accommodates the foam. An inner bottom surface of the accommodating box has a projection supporting a bottom surface of the foam so that the bottom surface of the foam is positioned separated from the inner bottom surface of the accommodating box.

8 Claims, 10 Drawing Sheets

(56) References Cited

U.S. PATENT DOCUMENTS

2016/0243832 A1* 8/2016 Kobayashi ........... B41J 2/16523

FOREIGN PATENT DOCUMENTS

| | | | |
|---|---|---|---|
| JP | 2008-023781 | A | 2/2008 |
| JP | 2013-060018 | A | 4/2013 |
| JP | 2014-094450 | A | 5/2014 |
| JP | 2016-153197 | A | 8/2016 |
| JP | 2017-193160 | A | 10/2017 |
| JP | 2023-101070 | A | 7/2023 |

OTHER PUBLICATIONS

European Patent Office, Partial European Search Report issued in European Patent Application No. EP 23161282.1, mailed Jul. 19, 2023.
Japan Patent Office, Notice of Reasons for Refusal issued in Japanese Patent Application No. 2022-039825, dated Nov. 26, 2024 (8 pages).

* cited by examiner

MAINTENANCE APPARATUS AND IMAGE RECORDING APPARATUS

REFERENCE TO RELATED APPLICATIONS

This application claims priority from Japanese Patent Application No. 2022-039825 filed on Mar. 15, 2022. The entire content of the priority application is incorporated herein by reference.

BACKGROUND ART

There is a known image recording apparatus which is provided with a head and a carriage having the head mounted thereon, and which ejects or discharges an ink from nozzles of the head in a case that the carriage moves in a predetermined direction. In order to prevent the nozzles from being clogged, the image recording apparatus moves the carriage to a predetermined position (hereinafter referred to as a “flushing position”) and performs flushing of discharging the ink from the nozzles. A flushing box accommodating a foam is located below the carriage which has been moved to the flushing position. The foam is made, for example, of a porous material and absorbs the ink discharged from the nozzles of the head during the flushing.

DESCRIPTION

In relation to the above-described image recording apparatus, there exists a maintenance apparatus described in Japanese Patent Application Laid-Open No. JP2013-60018A. This maintenance apparatus has an ink receiving chamber, a liquid injecting part and a waste liquid storing part. An absorbing member configured to absorb the ink jetted or discharged from the nozzles is positioned in the ink receiving chamber. The liquid injecting part injects a liquid (cleaning liquid) into the ink receiving chamber in a case that the head is away or separated from a location above the ink receiving chamber. The waste liquid storing part stores the ink and the liquid discharged (exhausted) from the ink receiving chamber. The absorbing member corresponds to the foam, and the ink receiving chamber corresponds to the flushing box.

In an image recording apparatus, in a case that the ink absorbed by the foam is left as it is, the ink dries, thickens and solidifies inside the foam. As a result, the ink absorbing power of the foam is lowered, and the ink accumulates on the upper surface of the foam, and there might be such an inconvenience that the accumulated ink makes contact with a nozzle surface of the head. To eliminate such an inconvenience, it is considered to provide the above-described maintenance apparatus on the image recording apparatus.

However, in the above-describe maintenance apparatus, the adsorbing member is accommodated in the ink receiving chamber so that the entirety of a bottom surface of the absorbing member makes contact with an inner bottom surface of the ink receiving chamber. Therefore, a mixture liquid or solution of the ink and the cleaning liquid accumulates in the vicinity of the bottom surface of the absorbing member; in a case that the concentration of the cleaning liquid is small, there might arise such an inconvenience that the ink solidifies in the inside of the absorbing member (corresponding to the foam).

The present disclosure has been made in view of the above-described circumstances, and an object of the present disclosure is to provide a means capable of reducing solidifying of the liquid in the inside of a foam.

(1) A maintenance apparatus according to an aspect of a present disclosure is a maintenance apparatus for an image recording apparatus provided with a head having a nozzle configured to discharge a liquid, the maintenance apparatus including: a foam configured to absorb the liquid discharged from the nozzle; and an accommodating box which is opened upwardly and which accommodates the foam. An inner bottom surface of the accommodating box has a projection supporting a bottom surface of the foam so that the bottom surface of the foam is positioned separated from the inner bottom surface of the accommodating box.

According to the maintenance apparatus, the bottom surface of the foam is supported by the projection to thereby cause the liquid absorbed by the foam to move to a space between the bottom surface of the foam and the inner bottom surface of the accommodating box. Accordingly, it is possible to reduce solidifying of the liquid in the inside of the foam.

(2) The projection may be a rib, and a space is formed by the bottom surface of the foam, the rib, and a part of the inner bottom surface of the accommodating box.

According to the maintenance apparatus, the bottom surface of the foam is supported by the rib to thereby cause the liquid absorbed by the foam to move to the space. Accordingly, it is possible to reduce solidifying of the liquid in the inside of the foam.

(3) The maintenance apparatus may further include a suction pump fluidly connected to the space.

(4) The space may be an enclosed space.

(5) The rib may be an annular rib.

(6) The inner bottom surface of the accommodating box may have a recess at a lower position in a gravity direction of an area surrounded by the annular rib, a cross sectional area of the recess orthogonal to the gravity direction decreasing as a position at which the cross-sectional area is taken shifts downward in the gravity direction.

(7) The rib may be configured to be positioned, as seen in the gravity direction, an outside of all the nozzle of the head so as to surround the all of the nozzle of the head.

(8) The maintenance apparatus may further include a plate pressing the foam and covering an upper part of the accommodating box, wherein the plate has an opening exposing a part of an upper surface of the foam; and the rib is positioned below a position, in the plate, different from the opening of the plate.

(9) At least one of inner side surfaces of the accommodating box may have a plurality of second ribs which makes contact with a side surface of the foam.

(10) The rib and the plurality of second ribs may be located at positions separated from one another in a direction extending within the inner bottom surface of the accommodating box.

(11) The maintenance apparatus may further include: a storage tank which is adjacent to the accommodating box and which is configured to store a cleaning liquid; a wiper unit which has a wiper and which is configured to rotate about a rotation shaft to a first position at which the wiper is immersed in the cleaning liquid stored in the storage tank and to a second position at which the wiper is not immersed in the cleaning liquid; and a partition separating the accommodating box and the storage tank from each other, wherein a height of the partition may be equal to a height of a forward end of the wiper in a case that the wiper unit is located at the first position.

(12) The rotation shaft of the wiper unit may be located at a position higher than the partition.

(13) The height of the partition may be higher than a height of the projection.

(14) A surface, of the partition, facing the foam may have a third rib making contact with a side surface of the foam.

(15) The accommodating box and the storing tank may be adjacent to each other, with the partition extending in a first direction being interposed between the accommodating box and the storing tank; a height of a central part in the first direction of the partition may be lower than heights of both end parts in the first direction of the partition; and a size in the first direction of the central part may be greater than a size in the first direction of the foam.

(16) An image recording apparatus according to an aspect of a present disclosure includes: a head having a nozzle configured to discharge a liquid; a carriage mounting the head and configured to move; and the maintenance apparatus of any one of those described above.

According to the maintenance apparatus and the image recording apparatus of the present disclosure, it is possible to reduce solidifying of the liquid in the inside of the foam.

Figure 5A:
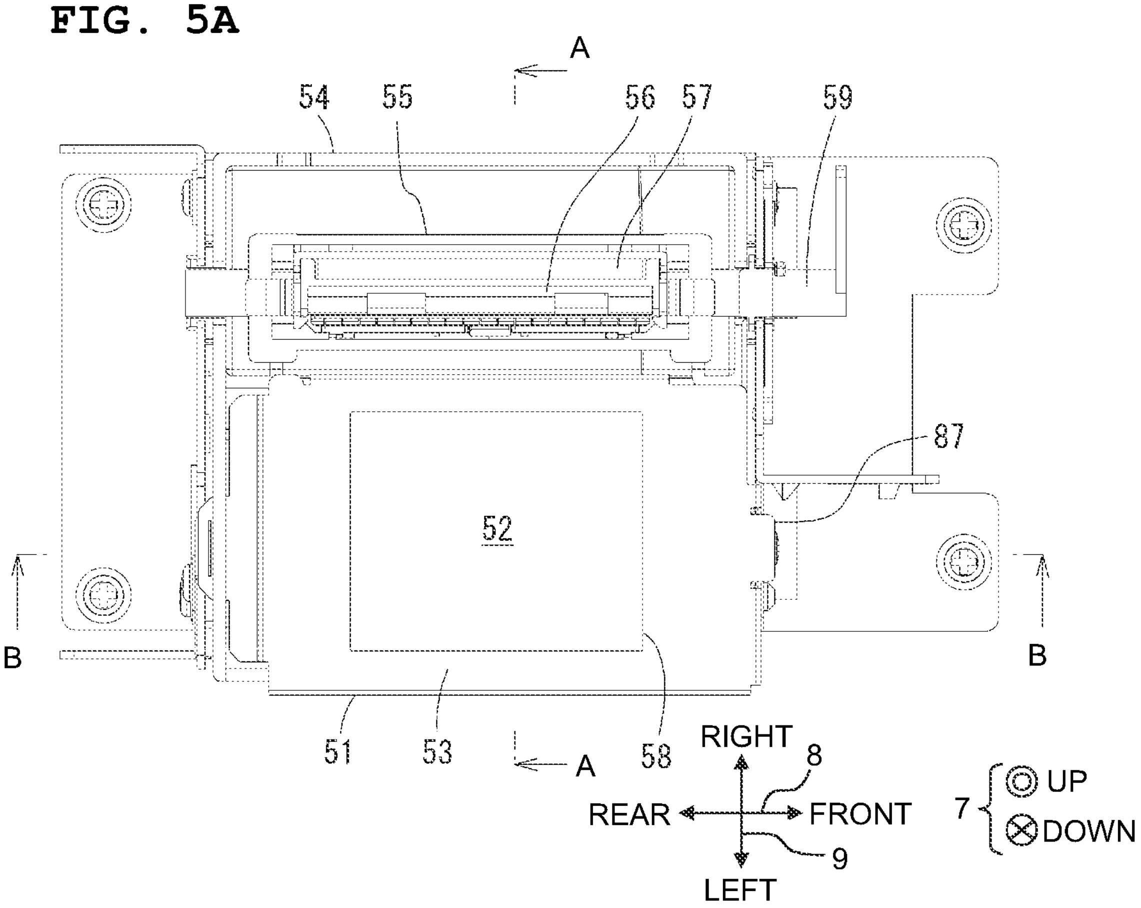
FIG. 5A is a top view of the maintenance apparatus 50.
Figure 6A:
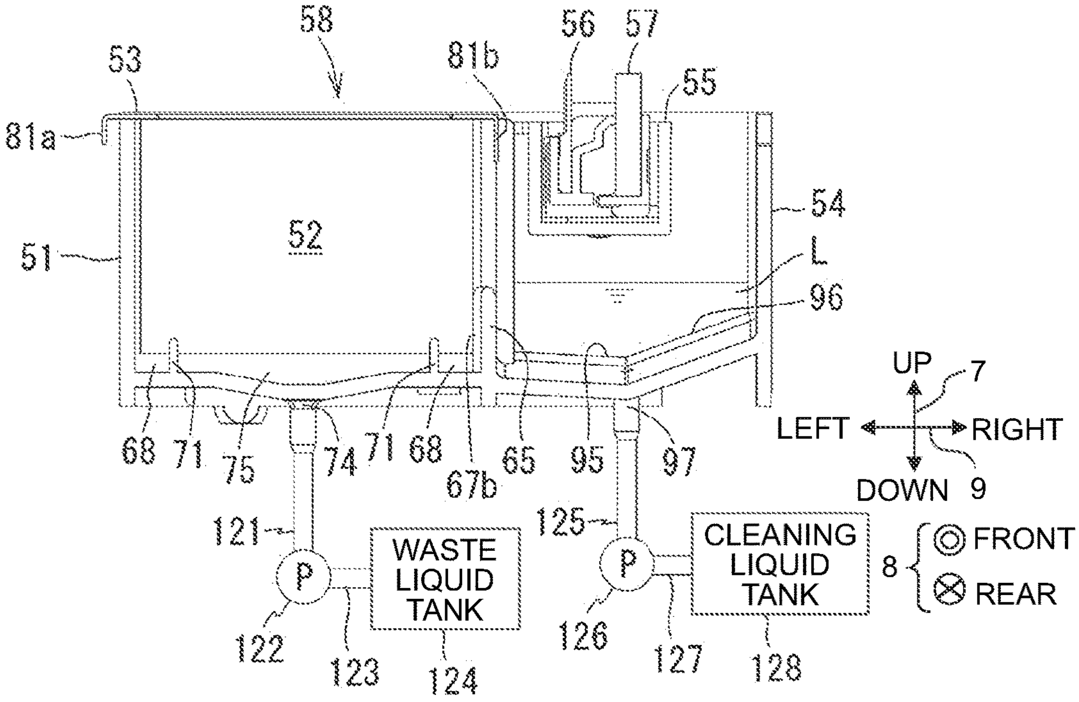
Figure 6B:
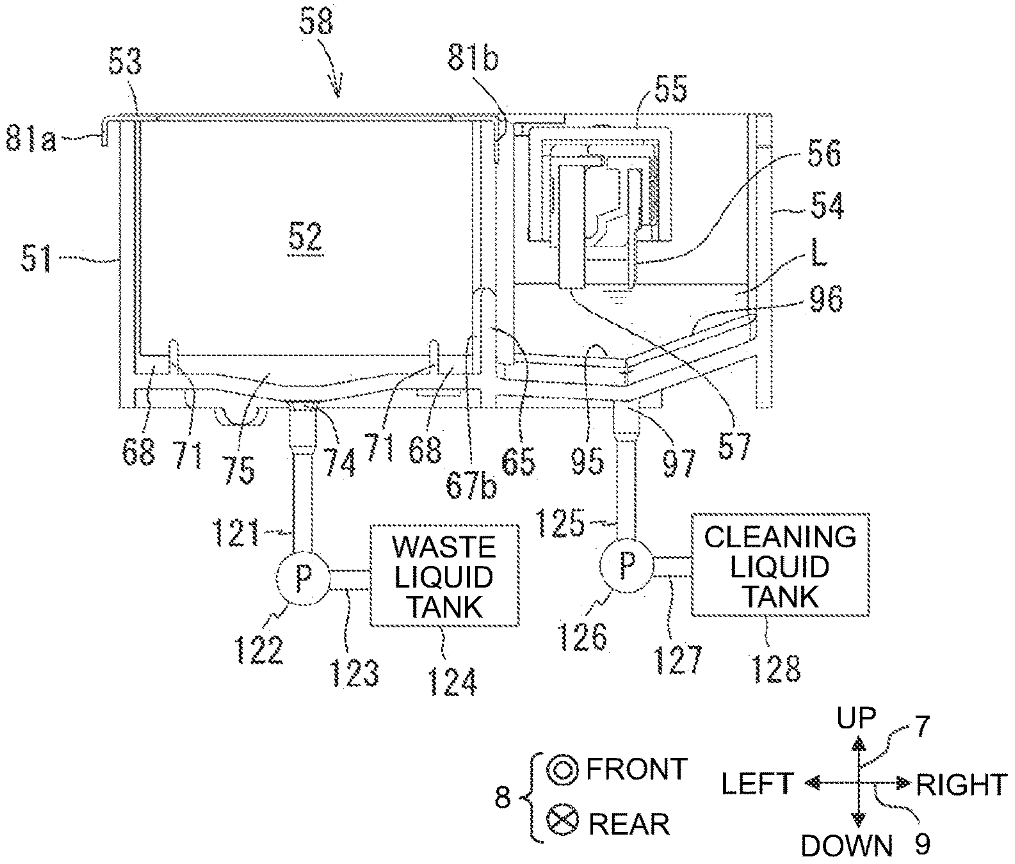

FIG. 6A and FIG. 6B are each a cross-sectional view of the main part of the maintenance apparatus 50, taken along a A-A line of FIG. 5A, wherein FIG. 6A depicts a case that a wiper unit 55 is positioned at an upward position, and FIG. 6B depicts a case that the wiper unit 55 is positioned at a downward position.

Figure 7:
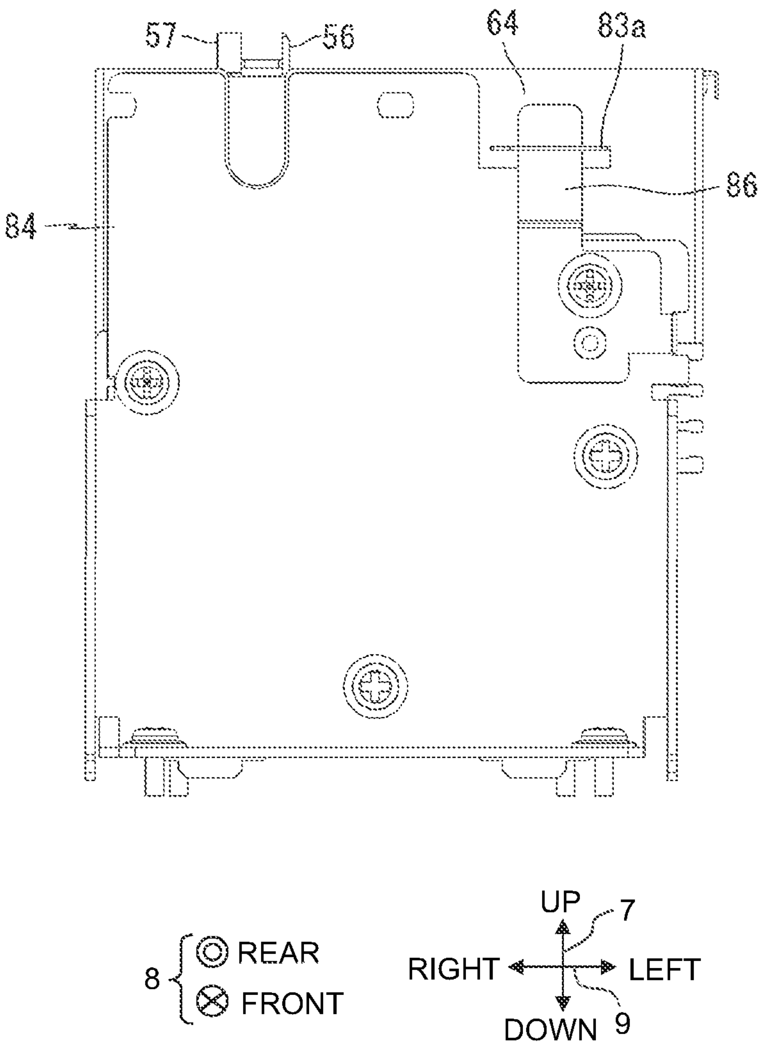

FIG. 7 is a rear side view of the maintenance apparatus 50.

Figure 8:
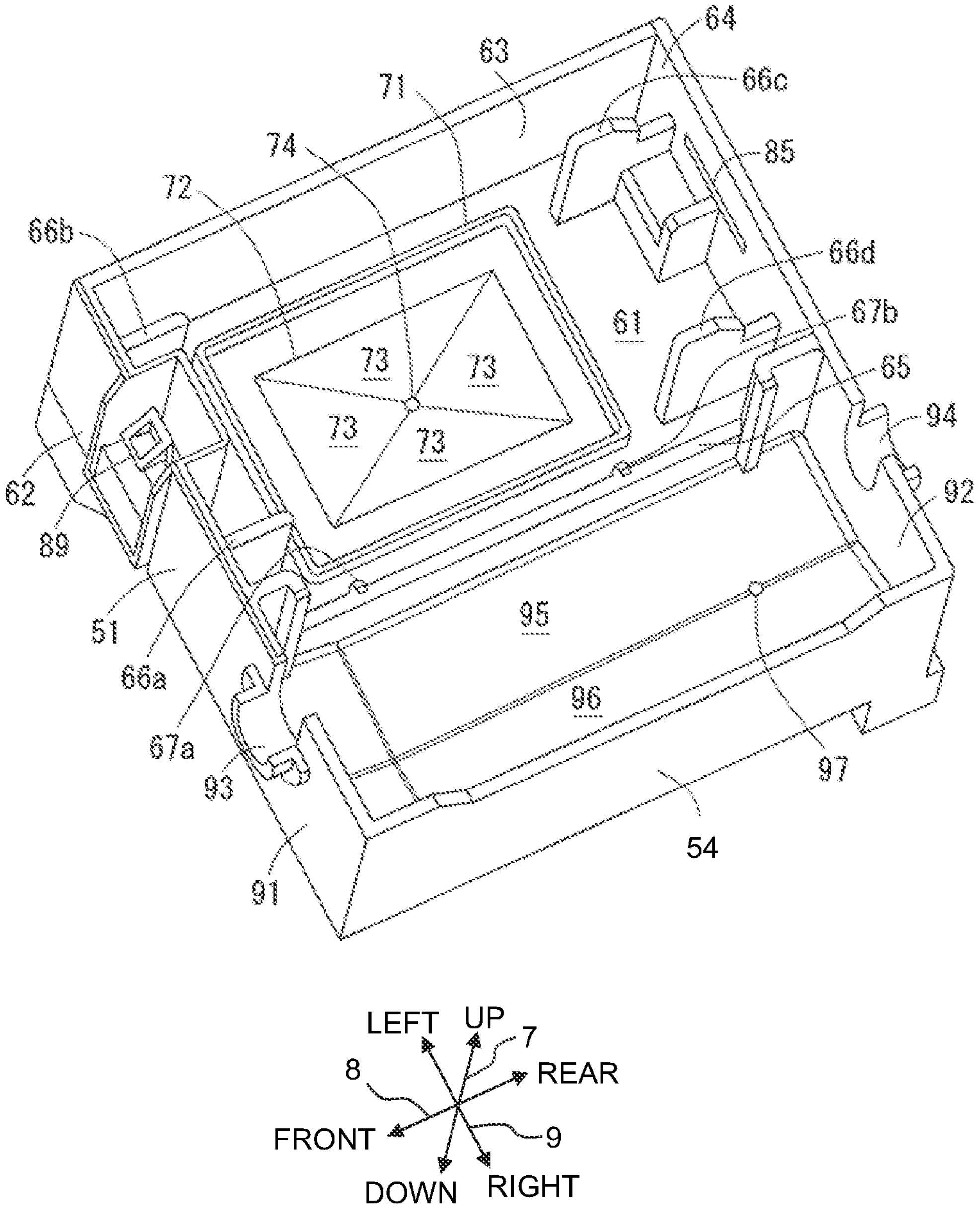

FIG. 8 is a perspective view depicting the inside of a flushing box 51 and the inside of a storage tank 54.

Figure 9:
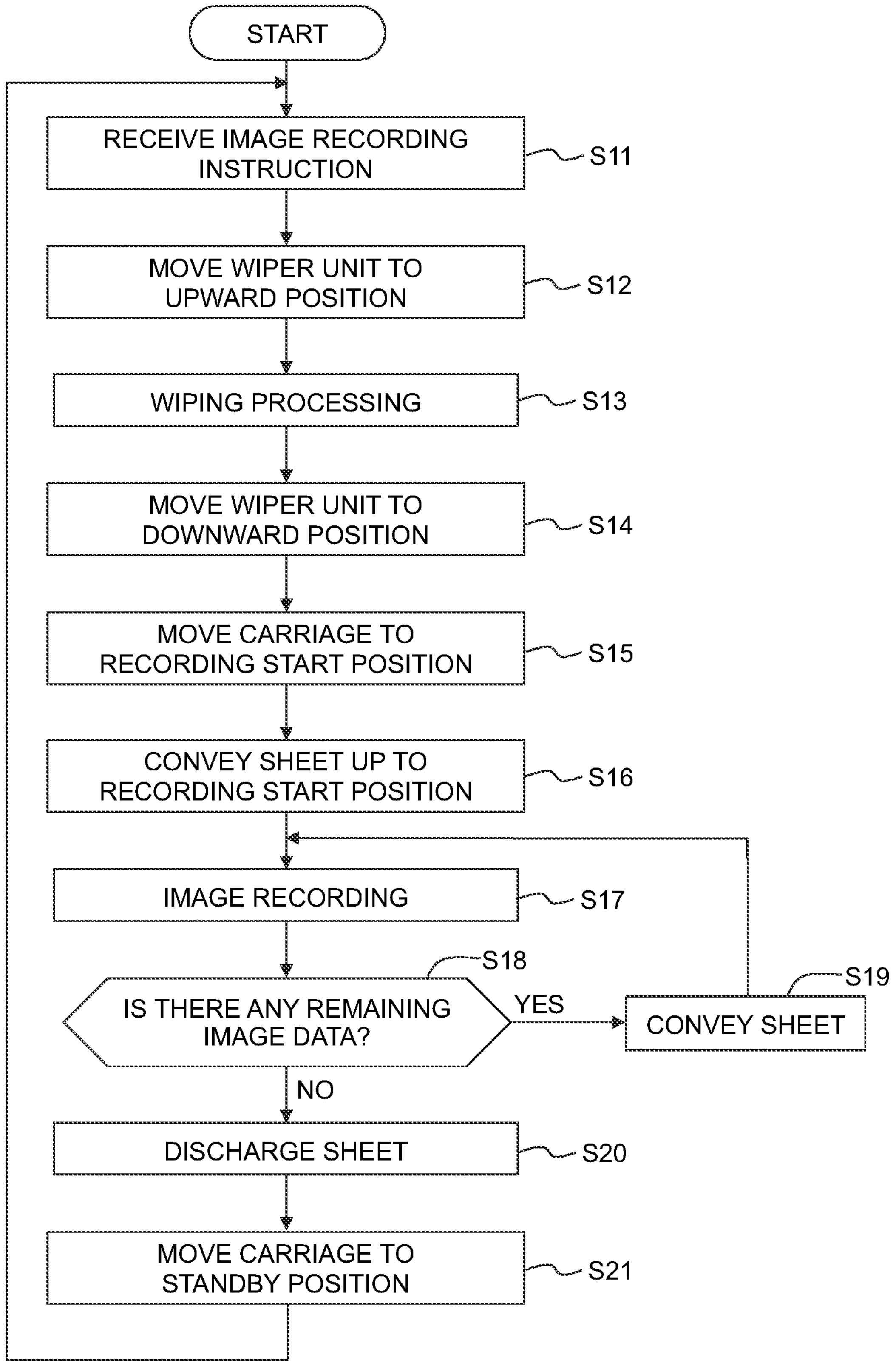

FIG. 9 is a flowchart indicating an image recording processing of the controller 100.

Figure 10A:
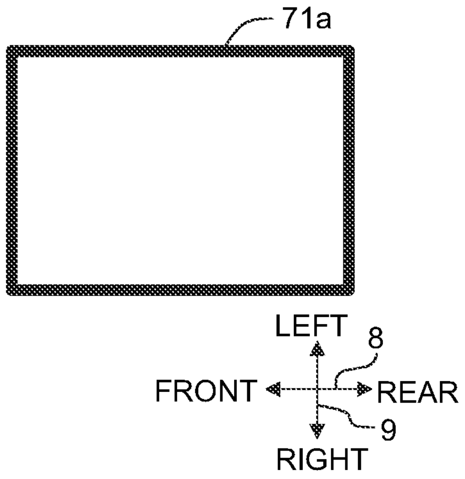

FIG. 10A is a view depicting a planar shape of a rib 71, and FIGS. 10B to 10F are views each of which depicts a planar shape of the rib 71.

A maintenance apparatus 50 and a printer 10 (an example of an "image recording apparatus") according to an embodiment of the present disclosure will be explained below. It goes without saying that the embodiment described below is merely an example of the present disclosure and that the embodiment of the present disclosure can be changed as appropriate, in a range not changing the gist and spirit of the present disclosure. In the following explanation, advancement or movement (progress) directed from a starting point to an end point of an arrow is expressed as an "orientation", and going forth and back on a line connecting the starting point and the end point of the arrow is expressed as a "direction". Further, an up-down direction 7 is defined based on a state in which the printer 10 is installed usably (a state of FIG. 1); a front-rear direction 8 is defined while defining a side on which a discharge port 13 is provided as a front side (front surface); and a left-right direction 9 is defined while seeing the printer 10 from the front side (front surface). The up-down direction 7, the front-rear direction 8, and the left-right direction 9 are orthogonal to one another.

[Overall Configuration of Printer 10]

Figure 1:
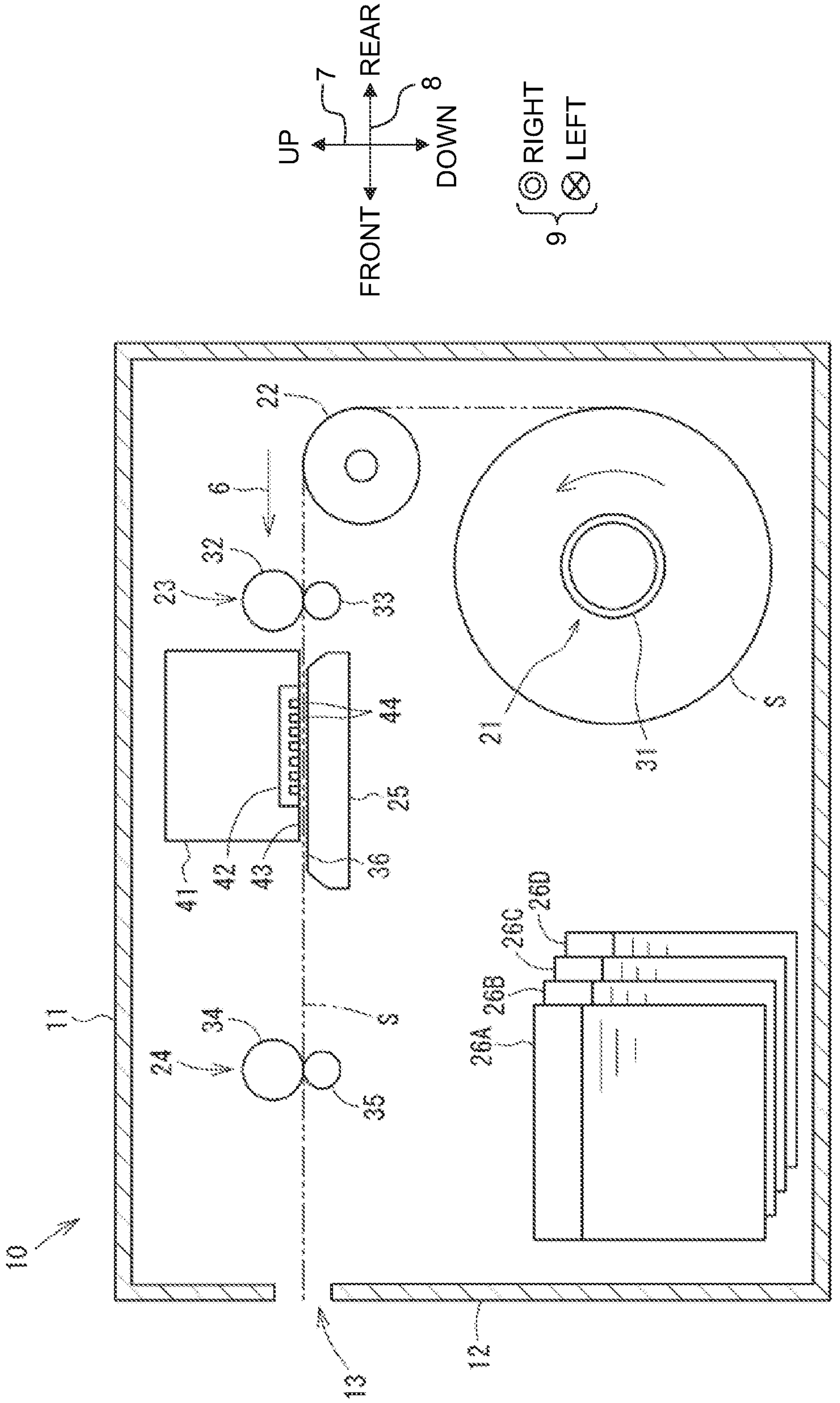
FIG. 1 is a schematic view depicting the internal configuration of a printer 10.

The printer 10 depicted in FIG. 1 is an image recording apparatus which records an image on a sheet S by the ink-jet recording system. The sheet S is a long sheet (paper sheet or paper) wound in a roll shape. In order to install the sheet S in the printer 10, a through hole is formed in the winding center of the sheet S. The recording medium (recording objective medium) may be sticker sheet, fanfold paper, cut paper, or fabric, etc.

The printer 10 is provided with a casing 11 having a shape which is substantially a rectangular parallelepiped. The casing 11 has a size which is placeable on a table or desk, on the floor, or on a rack, etc. A discharge port 13 having a slit shape and extending in the left-right direction 9 is positioned in a front wall 12 of the casing 11. From the discharge port 13, a sheet S on which an image is recorded by the printer 10 is discharged. The discharged sheet S is wound up, for example, by a winding device (not depicted in the drawings) attached to the printer 10.

Figure 2:
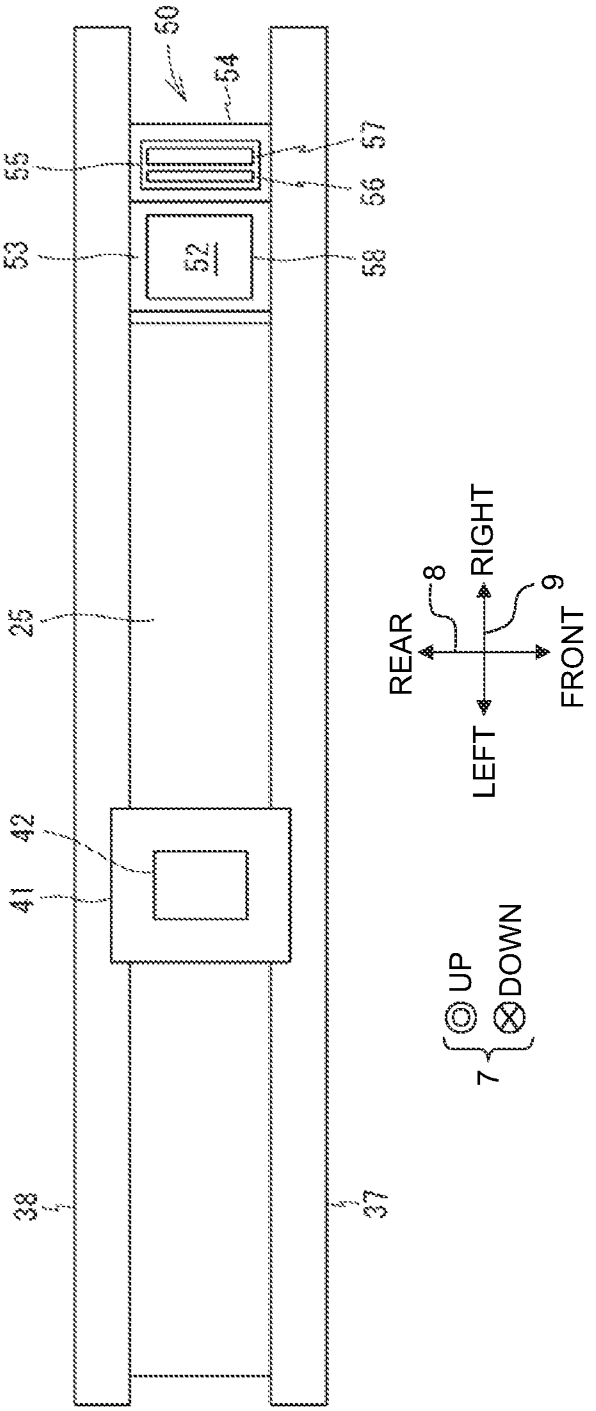
FIG. 2 is a view depicting a moving range of a carriage 41.
Figure 3:
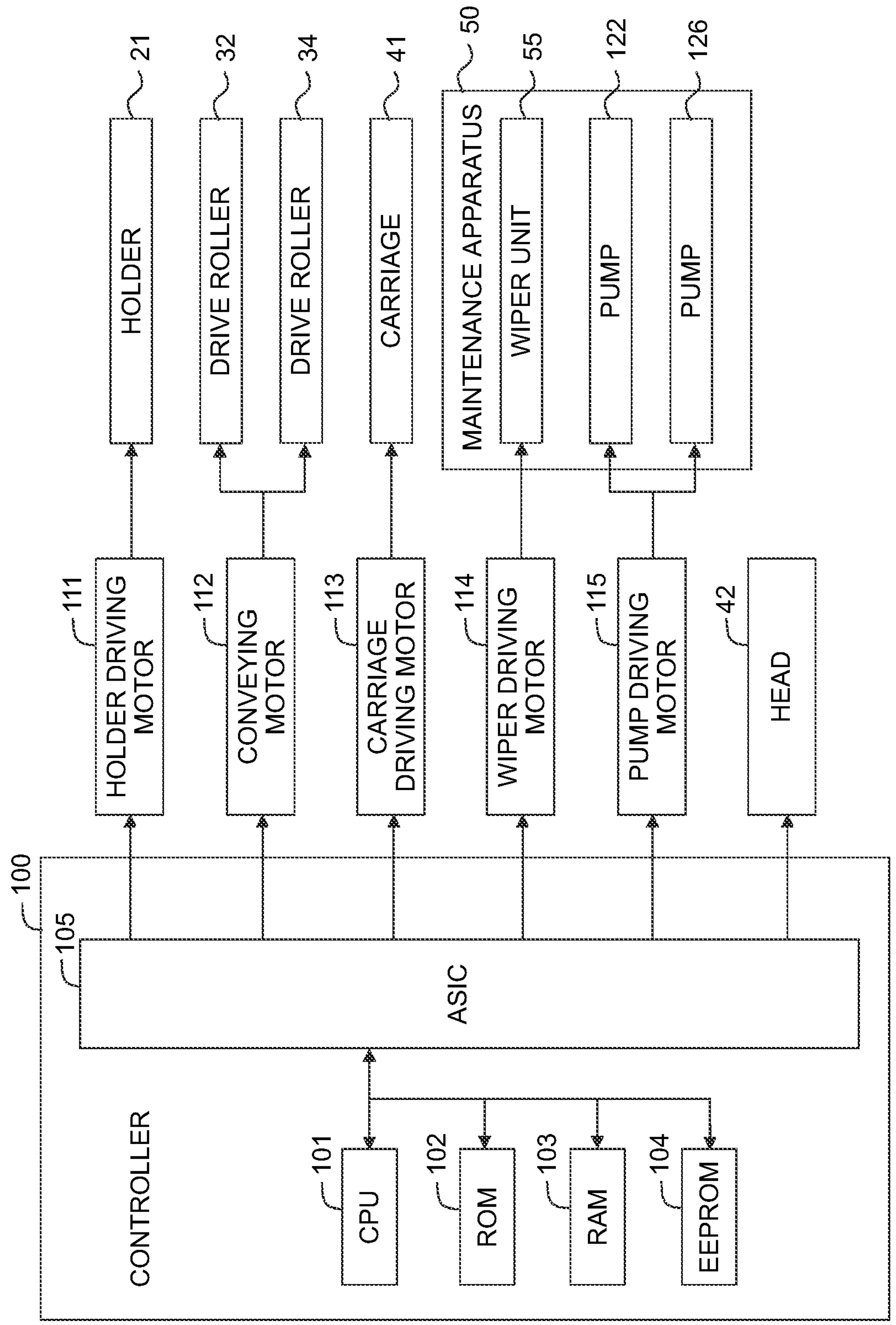
FIG. 3 is a block diagram depicting the configuration of a controller 100 and elements connected to the controller 100.

As depicted in FIG. 1, the printer 10 has, in the inside of the casing 11: a holder 21, a tensioner 22, a conveying roller pair 23, a discharging roller pair 24, a platen 25, four tanks 26A to 26D, a carriage 41 a and a head 42. The head 42 is mounted on the carriage 41. As depicted in FIG. 2, the printer 10 is further provided with, in the inside of the casing 11, two guide rails 37, 38 and a maintenance apparatus 50. As depicted in FIG. 3, the printer 10 has, within the casing 11, a controller 100, a holder driving motor 111, a conveying motor 112, a carriage driving motor 113, a wiper driving motor 114 and a pump driving motor 115. In addition to the above-described elements or components, the printer 10 may be further provided with a variety of kinds of sensors, a cap, etc.

[Tanks 26A to 26D]

The tanks 26A to 26D store yellow, magenta, cyan, and black inks (each of which is an example of a liquid), respectively. Each of the inks is a so-called latex ink and contains a pigment, resin fine particles, and an additive. Each of the inks has a viscosity suitable for uniformly dispersing the pigment and the resin fine particles. The pigment is the color of each of the inks. The resin fine particles are used to adhere the pigment to the sheet S. For example, the resin is a resin of which temperature exceeds the glass transition temperature by being heated by a heater (not depicted in the drawings).

Note that it is sufficient that the printer 10 is provided with one tank; in such a case, it is desired that the tank stores the black ink. The printer 10 may be further provided with a tank for storing a liquid different from the ink. The liquid stored in the tank includes, for example, a pre-processing liquid (pre-treatment liquid). The pre-treatment liquid may include a cationic polymer, a polyvalent metal salt (e.g., a magnesium salt), etc. The pre-treatment liquid has a function of reducing any ink blurring (ink blotting) and/or any ink bleed-through (back-through), by causing a component in the ink to aggregate or precipitate. In some cases, the pre-treatment liquid also has a function of improving the color developing property and/or the quick-drying property of the ink.

[Conveyance Mechanism for Sheet S]

A pair of side frames (not depicted in the drawings) extending in the up-down direction 7 and the front-rear direction 8 are located in the inside of the casing 11. The holder 21 has a rotation shaft 31 which supports the sheet S. The rotation shaft 31 extends in the left-right direction 9 and both ends of the rotation shaft 31 are fixed to the side frames. The power from the holder driving motor 111 (see FIG. 3)

is transmitted to the rotation shaft 31. This power causes the holder 21 to rotate in the circumferential direction of the rotation shaft 31. In FIG. 1, the direction of rotation of the holder 21 is counterclockwise. By the rotation of the holder 21, a roll body supported by the holder 21 also rotates. By the rotation of the conveying roller pair 23 and the discharging roller pair 24, the sheet S is drawn upwardly from a rear end of the roll body, and is guided to the tensioner 22.

The tensioner 22, the conveying roller pair 23 and the discharging roller pair 24 each extend in the left-right direction 9 between the side frames, and each are attached to be rotatable in the circumferential direction of a rotational axis parallel to the left-right direction 9. A rearward urging force is applied to the tensioner 22 by an urging member such as a spring, etc. The tensioner 22 makes contact with the sheet S drawn from the roll body and guides the sheet S to be curved forward.

The conveying roller pair 23 has a drive roller 32 and a pinch roller 33, and is positioned at a location in front of the tensioner 22. The discharging roller pair 24 has a drive roller 34 and a pinch roller 35 and is positioned at a location further in front of the conveying roller pair 23. The positions of lower ends, respectively, of the drive rollers 32 and 34 are substantially coincident with the position of an upper end of the tensioner 22 in the up-down direction 7. The pinch roller 33 makes contact with the drive roller 32 from a position below the drive roller 32. The pinch roller 35 makes contact with the drive roller 34 from a position below the drive roller 34.

The power from the conveying motor 112 (see FIG. 3) is transmitted to the drive rollers 32 and 34. This power causes the drive rollers 32, 34 to rotate. With this, the drive roller 32 conveys the sheet S in the conveyance orientation 6 while nipping the sheet S between the drive roller 32 and the pinch roller 33, and the drive roller 34 conveys the sheet S in the conveyance orientation 6 while nipping the sheet S between the drive roller 34 and the pinch roller 35. In this embodiment, the conveyance orientation 6 is frontward (frontward orientation).

[Platen 25]

The platen 25 is attached to the side frames at a location between the conveying roller pair 23 and the discharging roller pair 24 in the front-rear direction 8. The platen 25 extends in the left-right direction 9 between the side frames and has a support surface 36, for the sheet S, which spreads or extends in the front-rear direction 8 and the left-right direction 9. The support surface 36 is an upper end surface of the platen 25. An up-down position (position in the up-down direction 7) of the support surface 36 is substantially coincident with the position of the upper end of the tensioner 22. The platen 25 may be a suction platen which is configured to attract the sheet S, by suction, onto the support surface 36.

[Carriage 41 and Head 42]

As depicted in FIG. 2, the guide rails 37, 38 extend parallel to each other in the left-right direction 9. The positions in the up-down direction 7 of the guide rails 37 and 38 are same. The guide rail 38 is positioned behind the guide rail 37 in the front-rear direction 8. Both ends of each of the guide rails 37 and 38 are fixed to the side frames. The carriage 41 is supported by the guide rails 37 and 38. The power of the carriage driving motor 113 (see FIG. 3) is transmitted to a carriage driving mechanism (not depicted in the drawings). The carriage 41 is moved in the left-right direction 9 by the action of the carriage driving mechanism in a state that the carriage 41 is supported by the guide rails 37, 38.

As depicted in FIG. 1, the head 42 is mounted on the carriage 41. A lower surface of the head 42 is referred to as a nozzle surface 43. A plurality of nozzles 44 which are configured to discharge the inks are formed in the nozzle surface 43. The tanks 26A to 26D and the head 42 are connected via an ink channel (not depicted in the drawings). The inks stored, respectively, in the tanks 26A to 26D are supplied to the head 42 via the ink channel. While the carriage 41 is moving in the left-right direction 9, the ink(s) supplied to the head 42 is (are) discharged or ejected from the plurality of nozzles 44. With this, image recording is performed on the sheet S.

[Controller 100]

As depicted in FIG. 3, the controller 100 includes a CPU 101, a ROM 102, a RAM 103, an EEPROM 104 and an ASIC 105. The ROM 102 stores various kinds of data, etc., necessary for the operation of the controller 100. The RAM 103 is a working memory of the CPU 101. The EEPROM 104 stores a control program, etc., executed by the CPU 101. Before the printer 10 performs the image recording, the control program stored in the EEPROM 104 is copied to the RAM 103. The CPU 101 execute the control program stored in RAM 103. With this, the controller 100 executes an image recording processing which will be described later on.

The controller 100 is electrically connected, via the ASIC 105, to the holder driving motor 111, the conveying motor 112, the carriage driving motor 113, the wiper driving motor 114, the pump driving motor 115 and the head 42. Each of the holder driving motor 111, the conveying motor 112, the carriage driving motor 113, the wiper driving motor 114, the pump driving motor 115 rotates in accordance with the control from the controller 100, and generates the power (motive power). The head 42 discharges the ink(s) supplied to the head 42, in accordance with the control from the controller 100.

The holder 21 rotates by the power from the holder driving motor 111. The drive rollers 32 and 34 rotate by the power from the conveying motor 112. The sheet S is conveyed in the conveyance orientation 6 by the power from the conveying motor 112. The carriage 41 moves in the left-right direction 9 by the power from the carriage driving motor 113. A wiper unit 55 included in the maintenance apparatus 50 performs an operation which will be described later on by the power from the wiper driving motor 114. Pumps 122 and 126 included in the maintenance apparatus 50 perform an operation which will be described later on by the power from the pump driving motor 115. Note that some of the holder driving motor 111, the conveying motor 112, the carriage driving motor 113, the wiper driving motor 114 and the pump driving motor 115 may be realized by a common motor (one motor). Further, the motor driving the pump 122 and the motor driving the pump 126 may be separate motors.

[Moving Range of Carriage 41]

As depicted in FIG. 2, the platen 25 has a shape which is long in the left-right direction 9 and is located at a position which is below the carriage 41 in the up-down direction 7 (see FIG. 1). A left end of the platen 25 is positioned, in the left-right direction 9, in the vicinity of left ends of the guide rails 37 and 38. A right end of the platen 25 is positioned, in the left-right direction 9, at a location on the right side with respect to the centers in the left-right direction 9, respectively, of the guide rails 37, 38. The maintenance apparatus 50 is positioned, in the left-right direction 9, on the right side with respect to the platen 25. While the printer 10 is executing the image recording, the carriage 41 moves in the left-right direction 9 within a range of the platen 25. While the printer 10 is not executing the image recording, the carriage 41 is located at a position which is on the right side with respect to the maintenance apparatus 50 (hereinafter referred to as a "standby position"). While the carriage 41 is located at the standby position, the nozzle surface 43 of the head 42 is covered by a cap which is not depicted in the drawings.

[Maintenance Apparatus 50]

Figure 4:
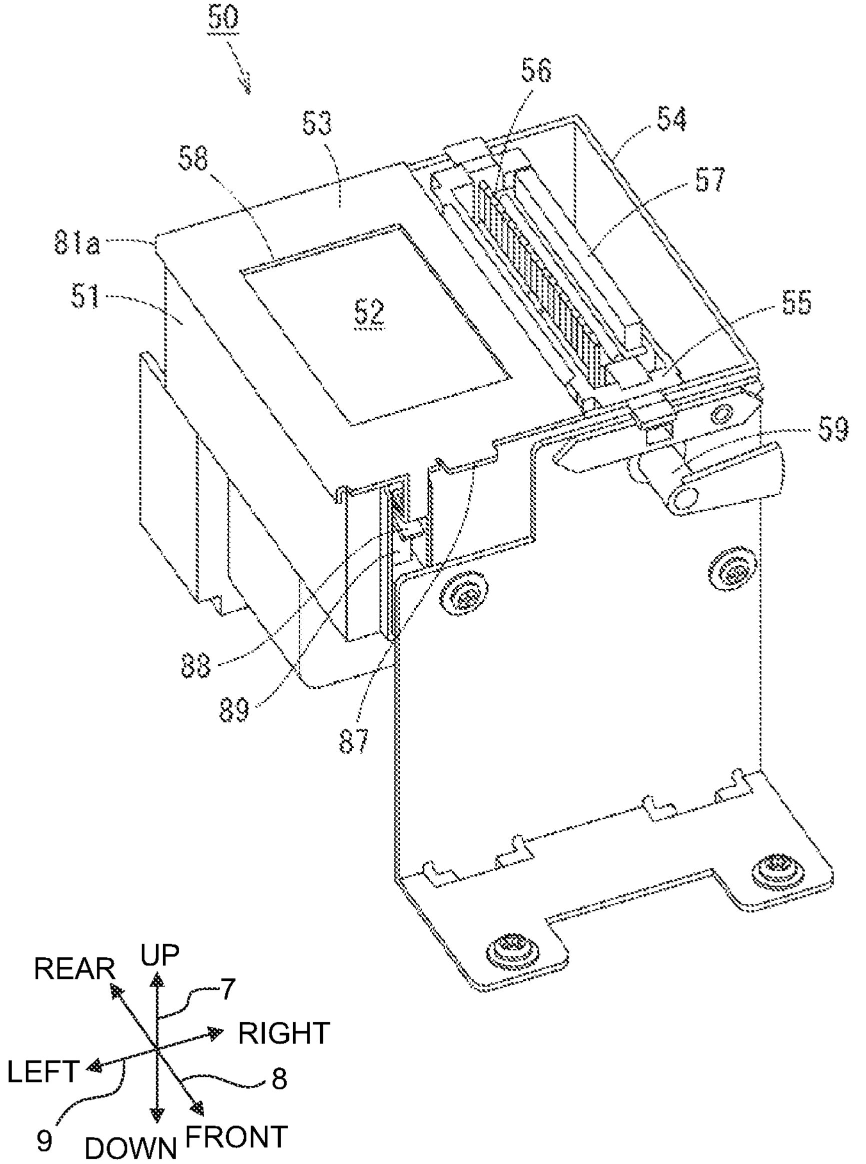
FIG. 4 is a perspective view depicting the outer appearance of a maintenance apparatus 50.

As depicted in FIG. 4, the maintenance apparatus 50 is provided with a flushing box 51, a flushing foam 52, a plate member 53, a storage tank 54, the wiper unit 55, and two wipers 56 and 57. As depicted in FIG. 6A, the maintenance apparatus 50 is further provided with the pump 122, 126, a waste liquid tank 124 and a cleaning liquid tank 128. The flushing box 51, the flushing foam 52, the plate member 53, the pump 122 and the waste liquid tank 124 are elements or components for the flushing processing. The storage tank 54, the wiper unit 55, the wipers 56, 57, the pump 126, and the cleaning liquid tank 128 are elements for a wiping processing.

As depicted in FIGS. 4, 5A, 6A and 8, the storage tank 54 is adjacent to the flushing box 51 and is positioned on the right side with respect to the flushing box 51. The flushing box 51 and the storage tank 54 are integrally formed (formed as a single unit). FIG. 8 depicts the inside of each of the flushing box 51 and the storage tank 54 in a state that the flushing foam 52, the plate member 53, the wiper unit 55 and the wipers 56, 57 are detached (omitted in the illustration).

[Flushing Box 51]

Figure 5B:
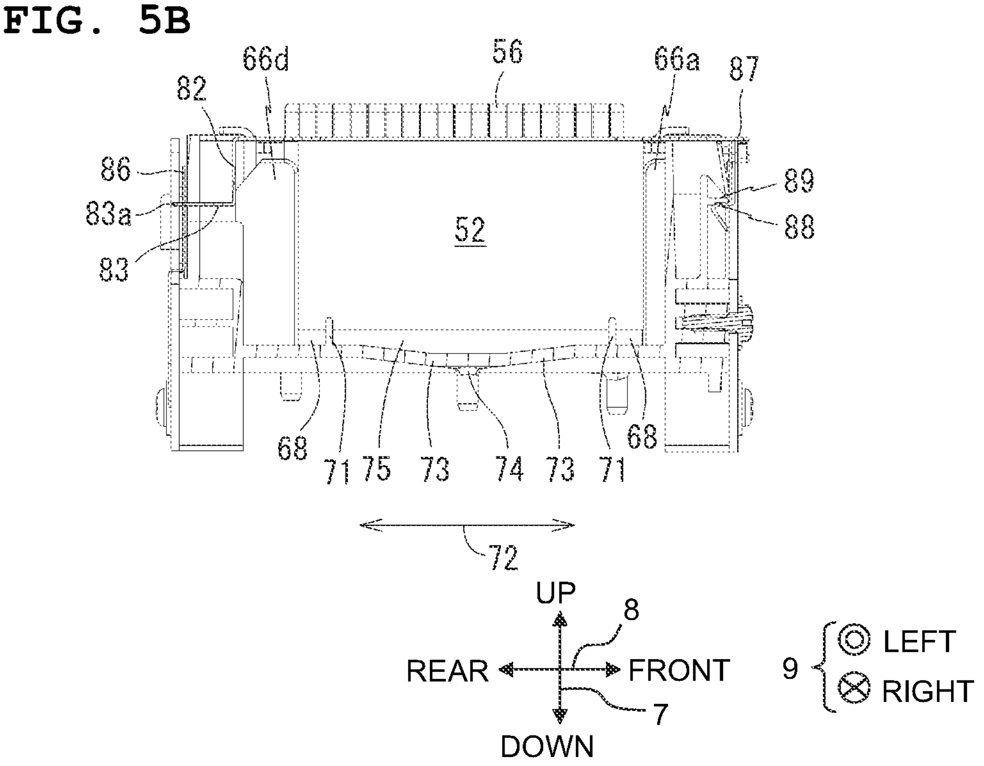
FIG. 5B is a cross-sectional view of a main part of the maintenance apparatus 50, taken along a B-B line of FIG. 5A.

As depicted in FIG. 8, the flushing box 51 has a box-like shape which does not have an upper surface. That is, the flushing box 51 is opened upwardly. As depicted in FIGS. 5B and 6A, the flushing box 51 is configured to accommodate or store the flushing foam 52 therein. The flushing foam 52 is formed of a porous material. The flushing foam 52 is, for example, a sponge. The flushing foam 52 is an example of a "foam". The flushing box 51 is an example of an "accommodating box".

As depicted in FIGS. 4 and 5A, the plate member 53 is configured to press or hold down the flushing foam 52 and to cover an upper part of the flashing box 51. The plate member 53 has an opening 58 which is located in a central part of the plate member 53 and which exposes a part of the upper surface of the flashing foam 52. The plate member 53 covers the entirety of the upper part of the flushing box 51, except for the position at which the opening 58 is located. The plate member 53 presses the flushing foam 52 in the inside of the flushing box 51. Specifically, in a state that the plate member 53 is locked to the flushing box 51, the plate member 53 causes a downward force to act on the flushing foam 52 accommodated in the flushing box 51.

In a case that the controller 100 performs the flushing processing, the controller 100 moves the carriage 41 to a location above the flushing box 51. The opening 58 is formed so that all the plurality of nozzles 44 of the head 42 face the flushing foam 52 in a case that carriage 41 is positioned above the flushing box 51. It is desired that the shape of the opening 58 is same as the shape of an arrangement area in which the plurality of nozzles 44 are arranged in the head 42. It is more desired that the size of the opening 58 is same as, or is slightly greater than, the size of the arrangement area of the plurality of nozzles 44 in the head 42. The flushing foam 52 accommodated in the flushing box 51 is used to absorb the ink(s) discharged from the plurality of nozzles 44 of the head 42 by the flushing processing.

As depicted in FIG. 8, the flushing box 51 has a lower wall 61, a front wall 62, a left wall 63, a rear wall 64, and a partition 65. The partition 65 partitions or divides the flushing box 51 and the storage tank 54 from each other. The lower wall 61, the front wall 62, the left wall 63, the rear wall 64 and a part of the partition 65 partition or define the internal space of the flushing box 51.

The front wall 62 has two ribs 66*a*, 66*b* protruding towards the internal space of the flushing box 51. The rear wall 64 has two ribs 66*c* and 66*d* protruding towards the internal space of the flushing box 51. The partition 65 has two ribs 67*a*, 67*b* protruding towards the internal space of the flushing box 51. A bottom surface of each of the ribs 66*a* to 66*d*, 67*a* and 67*b* is fixed to an inner surface of the lower wall 61.

The ribs 66*a* and 66*b* make contact with a front side surface of the flushing foam 52 (see FIG. 5B). The ribs 66*c* and 66*d* make contact with a rear side surface of the flushing foam 52. The ribs 67*a* and 67*b* make contact with a right side surface of the flushing foam 52 (see FIG. 6A). In such a manner, one of the inner side surfaces of the flushing box 51 (the inner surface of the front wall 62) has the two ribs 66*a*, 66*b* which make contact with the front side surface of the flushing foam 52. Another one of the inner side surfaces of the flushing box 51 (the inner surface of the rear wall 64) has the two ribs 66*c*, 66*d* which make contact with the rear side surface of the flushing foam 52. A surface, of the partition 65, on the side of the flushing foam 52 has the two ribs 67*a* and 67*b* which make contact with the right side surface of the flushing foam 52. The ribs 66*a* to 66*d* are each an example of a "second rib". The ribs 67*a* and 67*b* are each an example of a "third rib".

[Rib 71 and Recessed Part 72]

As depicted in FIG. 8, a rib 71 being annular (that is, an annular rib) protruding towards the internal space of the flushing box 51 is located at a central part of the inner surface of the lower wall 61. The planar shape of the rib 71 is substantially rectangular. The rib 71 has a planar shape which is capable of enclosing or surrounding all of the plurality of nozzles 44 of the head 42. That is, in a case that the head 42 is positioned above the rib 71, all of the plurality of nozzles 44 of the head 42 can be positioned inside the rib 71 as seen in the up-down direction 7. A bottom surface of the flushing foam 52 accommodated in the flushing box 51 makes contact with an upper surface of the rib 71. The rib 71 supports the bottom surface of the flushing foam 52. In such a manner, an inner bottom surface of the flushing box 51 has the rib 71 being annular which supports the bottom surface of the flushing foam 52.

The rib 71 is located below a position (or an area), of the plate member 53, which is different from the position (or the area) at which the opening 58 is located. It is desired that the planar shape of the rib 71 is smaller than the entirety of the nozzle surface 43 and is greater than a part (nozzle area), of the nozzle surface 43, in which the plurality of nozzle 44 are formed. By making the planar shape of the rib 71 greater than the nozzle area, it is possible to collect, into a space 75, the inks which are discharged from all of the plurality of nozzles 44 of the head 42 and which are absorbed by the flushing foam 52.

The height of the rib 71 is lower than the height of partition 65. In other words, the height of the partition 65 is higher than the height of the rib 71. Further, the rib 71 is located at a position separated from the positions of the ribs 66*a* to 66*d*, and the rib 71 is located at a position separated from the positions of the ribs 67*a* and 67*b*. In the internal space of the flushing box 51, a part 68 (see FIGS. 5B and 6A) configured to store a cleaning liquid supplied from the storage tank 54 is formed at a location at the outside of the rib 71. This part 68 is formed by positioning each of the plurality of ribs 66*a* to 66*d* at a position separated from the rib 71.

A recessed part 72 is positioned in a part, in the inner surface of the lower wall 61, which is surrounded by the rib 71. The recessed part 72 is a part which is further away from the internal space of the flushing box 51 as closer to the center of the recessed part 72, and which is formed by four triangular-shaped inclined surfaces 73. An exhaust port 74 is positioned at the center of the recessed part 72. In such a manner, the inner bottom surface of the flushing box 51 has a recessed part (recess) 72 at a lower position in a gravity direction of (than) an area surrounded by the rib 71 being annular (the annular rib), a cross sectional area of the recessed part 72 orthogonal to the gravity direction decreasing as a position at which the cross-sectional area is taken or measured shifts downward in the gravity direction (that is, the lower the position is, the smaller the cross-sectional area is).

[Space 75 and Pump 122]

As depicted in FIGS. 5B and 6A, the space 75 is defined by the bottom surface of the flushing foam 52, the side surface at the inside of the rib 71 and the part, of the inner surface of the lower wall 61 of the flushing box 51, which is surrounded by the rib 71 (including the four inclined walls 73). In a case that the flushing foam 52 is considered as one solid body, the space 75 is an enclosed space.

As depicted in FIG. 6A, the space 75 is connected to one end of the pump 122 via the exhaust port 74 and a tube 121. The pump 122 is fluidly connected to the space 75. The other end of the pump 122 is connected to one end of the tube 123, and the waste liquid tank 124 is positioned at the other end of the tube 123. In a case that the pump 122 is driven by the pump driving motor 115 (see FIG. 3), the pump 122 imparts a negative pressure to the space 75. The pump 122 is an example of a "suction pump".

[Plate Member 53]

The plate member (plate-like member, plate) 53 is a member obtained by forming the openings 58 in a metal plate and by machining the respective ends of the metal plate. As depicted in FIG. 6A, a vertical part 81*a* is formed at a left end of the plate member 53 and a vertical part 81*b* is formed at a right end of the plate member 53. The vertical parts 81*a* and 81*b* are formed by bending two ends, of the metal plate, which face each other (a left end part and a right end part of the metal plate) so that the two ends are orthogonal to an upper surface of the plate member 53. The vertical parts 81*a* and 81*b* are formed so that in a case that the plate member 53 is locked to the flushing box 51, the vertical parts 81*a* and 81*b* reduce deviating of the plate member 53 in the left-right direction 9.

As depicted in FIG. 5B, a vertical part 82 and a horizontal part 83 are formed in a rear end of the plate member 53. The vertical part 82 is formed by bending another end of the metal sheet (a part which becomes the rear end of the plate member 53) so that the another end is orthogonal to the upper surface of the plate member 53. The horizontal part 83 is formed by bending the bent part of the metal sheet further outwardly (in a direction separated from the center of the plate 53) so that the further bent part is parallel to the upper surface of the plate 53.

As depicted in FIG. 7, the rear wall 64 of the flushing box 51 is fixed to a casing 84 of the maintenance apparatus 50. As depicted in FIG. 8, the rear wall 64 of the flushing box 51 has an opening 85 which is configured to allow a forward end part 83*a* of the horizontal part 83 of the plate member 53 to pass therethrough. The forward end part 83*a* of the horizontal part 83 is inserted into the opening 85. The forward end part 83*a* of the horizontal part 83 has an opening (not depicted in the drawings) configured to allow an upper part of a plate spring 86 to pass therethrough. The upper part of the plate spring 86 is inserted into the opening of the forward end part 83*a* of the horizontal part 83. As depicted in FIG. 7, a lower part of the plate spring 86 is fixed to the casing 84 of the maintenance apparatus 50. The upper part of the plate spring 86 urges the forward end part 83*a* in an orientation away from the rear wall 64 of the flushing box 51. In such a manner, the rear end of the plate member 53 is fixed to the flushing box 51 via the plate spring 86. The plate spring 86 urges the plate member 53 in an orientation away from the upper part of the flushing box 51.

As depicted in FIGS. 5A and 5B, an operating part 87 and a hook 88 are formed in a front end of the plate member 53. The operating part 87 is a part of which width is narrower than that of the front end of the plate member 53. The operating part 87 has a width suitable for a user of the printer 10 to lift the operating part 87 upwardly with a finger of the user. The hook 88 is formed by bending a metal plate of which width is narrower than that of the metal plate forming the plate member 53 in a direction of 90° and in a direction of 60°. The hook 88 is fixed to the front end of the plate member 53.

As depicted in FIG. 8, a hook receiving part 89 is located at the outside of the front wall 62 of the flushing box 51. The position of the hook receiving part 89 is a position which is close to the hook 88 in a case that the plate member 53 covers the upper part of the flushing box 51. In a case that the plate member 53 covers the upper part of the flushing box 51, the hook 88 engages with the hook receiving part 89 and the plate member 53 is locked to the flushing box 51.

In a case that the flushing processing is performed repeatedly, there arises a need to exchange the flushing foam 52. In a case that the user of the printer 10 exchanges the flushing foam 52, the user lifts the operating part 87 upwardly until the hook 88 is detached from the hook receiving part 89. In a case that the hook 88 is detached from the hook receiving part 89, the plate member 53 rotates with the rear end side thereof as the center of rotation due to the urging force of the plate spring 86, and is away from the upper part of the flushing box 51. Accordingly, in a case that the user of the printer 10 exchanges the flushing foam 52, it is possible to reduce such a situation that the user fails to lock the plate member 53 to the flushing box 51.

[Storage Tank 54 and Wiper Unit 55]

As depicted in FIG. 8, the storage tank 54 has a box-like shape which does not have an upper part. As depicted in FIG. 6A, the storage tank 54 stores a cleaning liquid L in the inside thereof. The cleaning liquid L is a liquid suitable for removing any unwanted substance (unnecessary matter) adhered to the nozzle surface 43 of the head 42; as the cleaning liquid L, for example, glycerin is used.

The wipers 56 and 57 are attached to the wiper unit 55 so that forward end parts, respectively, of the wipers 56 and 57 are located at the outside of the storage tank 54. The wiper 56 is not impregnated with the cleaning liquid L and deforms in response to an external force while maintaining the shape of the wiper 56 to some extent. On the other hand, the wiper 57 is impregnated with the cleaning liquid L and deforms, with a high degree of freedom, in response to the external force. The wiper 56 is formed, for example, of a rubber material. The wiper 57 is formed, for example, of a porous material.

As depicted in FIG. 4, the wiper unit 55 has a rotation shaft 59. As depicted in FIG. 8, the front wall 91 of the storage tank 54 has a support part 93 and the rear wall 92 of the storage tank 54 has a support part 94. The support part 93 is configured to support one end of the rotation shaft 59 of the wiper unit 55, and the support part 94 is configured to support the other end of the rotation shaft 59. With this, the wiper unit 55 is supported by the storage tank 54 so that the wiper unit 55 is rotatable with the rotation shaft 59 as the center of the rotation.

The power of the wiper driving motor 114 (see FIG. 3) is transmitted to a wiper driving mechanism (not depicted in the drawings), thereby causing the rotation shaft 59 of the wiper unit 55 to make a half rotation; accompanying with this, the wiper unit 55 and the wipers 56, 57 make a half rotation with the rotation shaft 59 as the center of the half rotation. With this, the wiper unit 55 rotates (pivots) to a position at which the forward end parts of the wipers 56 and 57 are oriented upward (a position depicted in FIG. 6A, hereinafter referred to as an “upward position”) and to a position at which the forward end parts of the wipers 56 and 57 are oriented downward (a position depicted in FIG. 6B, hereinafter referred to as a “downward position”).

In a case that the wiper unit 55 is located at the upward position, the wipers 56 and 57 are not immersed in the cleaning liquid L stored the storage tank 54, and are located at a position at which the wipers 56 and 57 are capable of making contact with the nozzle surface 43 of the head 42. In a case that the wiper unit 55 is located at the downward position, a part of the wiper 56 and a part of the wiper 57 are immersed in the cleaning liquid L stored in the storage tank 54, and the wipers 56 and 57 are located at a position at which the wipers 56 and 57 are not capable of making contact with the nozzle surface 43. A height of the partition 65 is equal to a height of each of the forward end parts of the wipers 56, 57 in a case that the wiper unit 55 is located at the downward position. The downward position is an example of a “first position” at which the wipers 56, 57 are immersed in the cleaning liquid L stored in the storage tank 54. The upward position is an example of a “second position” at which the wipers 56, 57 are not immersed in the cleaning liquid L stored in the storage tank 54.

[Supply of Cleaning Liquid L and Partition 65]

As depicted in FIGS. 6A and 8, a lower wall of the storage tank 54 is constructed of two inclined walls 95 and 96. The inclined wall 95 extends in the front-rear direction 8 and is positioned on the right side with respect to the flushing box 51. The inclined wall 96 extends in the front-rear direction 8 and is positioned further on the right side with respect to the inclined wall 95. A right end of the inclined wall 95 and a left end of the inclined wall 96 are at a same height and are connected to each other in a liquid tightly manner. A left end of the inclined wall 95 is located at a position slightly higher than a position of the right end of the inclined wall 95. A right end of the inclined wall 96 is located at a position higher than a position of the left end of the inclined wall 96. A supply port 97 of the cleaning liquid L is located at a position, in a connection part at which the inclined walls 95 and 96 are connected to each other, which is close to the rear wall 92.

As depicted in FIG. 6A, the supply port 97 is connected to one end of the pump 126 via a tube 125. The other end of the pump 126 is connected to the cleaning liquid tank 128 via a tube 127. The cleaning liquid tank 128 stores an unused cleaning liquid. In a case that the pump 126 is driven by the pump driving motor 115 (see FIG. 3), the pump 126 supplies the unused cleaning liquid stored in the cleaning liquid tank 128 to the storage tank 54. The cleaning liquid L stored in the storage tank 54 is supplied from the cleaning liquid tank 128 to the storage tank 54 by using the pump 126.

As depicted in FIGS. 6A and 8, the flushing box 51 and the storage tank 54 are adjacent to each other in the left-right direction 9, with the partition 65 extending in the front-rear direction 8 being interposed therebetween. The partition 65 is lower than the front wall 62, the left wall 63 and the rear wall 64. As depicted in FIG. 8, a height of a central part in the front-rear direction 8 of the partition 65 is lower than those of both end parts in the front-rear direction 8 of the partition 65. In other words, the central part in the front-rear direction 8 of the partition 65 is lower than the both end parts in the front-rear direction 8 of the partition 65. The size in the front-rear direction 8 of the central part of the partition 65 is greater than the size in the front-rear direction 8 of the flushing foam 52. The rotation axis 59 of the wiper unit 55 is located at a position higher than the partition 65 (see FIG. 8). Note that the front-rear direction 8 is an example of a “first direction”.

In a case that the pump 126 is operated and that the cleaning liquid is supplied from the cleaning liquid tank 128 to the storage tank 54, a part of the cleaning liquid L stored in the storage tank 54 flows over the partition 65 and flows into the inside of the flushing box 51. The cleaning liquid L flowed into the inside of the flushing box 51 flows through the space at the outside of the rib 71 and surrounds the outer side of the rib 71. The cleaning fluid L located at the outside of the rib 71 is absorbed by the flushing foam 52 and diffuses in the inside of the flushing foam 52.

[Image Recording Processing]

With reference to FIG. 9, an image recording processing by the controller 100 will be explained. At a point of time that the controller 100 reaches step S11, the carriage 41 is located at the standby position and the wiper unit 55 is located at the downward position. At this time, the part of the wiper 56 and the part of the wiper 57 are immersed in the cleaning liquid L stored in the storage tank 54.

The controller 100 receives an image recording instruction from an operation part (not depicted in the drawings) (step S11). Specifically, the controller 100 stands by in step S11 until the controller 100 receives the image recording instruction. In a case that the controller 100 receives the image recording instruction in step S11, the controller 100 controls the wiper driving motor 114 to thereby move the wiper unit 55 to the upward position (step S12).

Next, the controller 100 executes a wiping processing (step S13). In step S13, the controller 100 controls the carriage driving motor 113 to thereby cause the carriage 41 to move in the leftward orientation from the standby position to a position above the wiper unit 55. In this situation, the carriage 41 moves in the leftward orientation while the wipers 56 and 57 are making contact with the nozzle surface 43 of the head 42. The controller 100 controls the carriage driving motor 113 to thereby cause the carriage 41 to move to a position at which the wipers 56 and 57 do not make contact with the nozzle surface 43 of the head 42. At this point of time, the controller 100 ends the wiping processing. Next, the controller 100 controls the wiper driving motor 114 to thereby cause the wiper unit 55 to move to the downward position (step S14).

Next, the controller 100 controls the carriage driving motor 113 to thereby move the carriage 41 in the leftward orientation to the recording start position (step S15). The recording start position is a predetermined position at which the carriage 41 faces the platen 25. Next, the controller 100 controls the holder driving motor 111 and the conveying motor 112 to thereby convey the sheet S to the recording start position (step S16). Note that the controller 100 may execute step S16 in parallel to all or a part of steps S12 to S15.

Next, the controller 100 executes image recording on the sheet S (step S17). In step S17, the controller 100 controls the carriage driving motor 113 to thereby move the carriage 41 in the left-right direction 9 (to move leftward or rightward orientation). The controller 100 controls the head 42 while the carriage 41 is moving in the left-right direction 9, thereby causes the plurality of nozzles 44 of the head 42 to discharge the ink(s) in an amount corresponding to image data.

Next, the controller 100 determines whether there is any remaining image data (step S18). In accordance with the determination made by the controller 100 that there is the remaining image data in step S18 (step S18: YES), the controller 100 proceeds to step S19. In this case, the controller 100 controls the conveying motor 112 to thereby convey the sheet S by a predetermined amount (step S19). Then, the controller 100 proceeds to step S17.

In accordance with the determination made by the controller 100 that there is not any remaining image data in step S18 (step S18: NO), the controller 100 proceeds to step S20. In this case, the controller 100 controls the conveying motor 112 to thereby discharge the sheet S up to a predetermined position (step S20). Next, the controller 100 controls the carriage driving motor 113 to thereby move the carriage 41 in the rightward orientation up to the standby position (step S21). Then, the controller 100 proceeds to step S11 so as to execute a next image recording.

[Flushing Processing]

In a case, for example, that an elapsed time which has elapsed since the flushing processing executed the last time exceeds a threshold value or in a case that the controller 100 receives an instruction from the user of the printer 10, the controller 100 determines that the flushing processing needs to be performed. The controller 100 performs the flushing processing in accordance with the determination made by the controller 100 that the flushing processing needs to be performed.

As described above, in a case that the controller 100 performs the flushing processing, the controller 100 controls the carriage driving motor 113 to thereby cause the carriage 41 to move to the location above flushing box 51. The opening 58 is formed such that, in a case that the carriage 41 is positioned above the flushing box 51, all of the plurality of nozzles 44 of the head 42 face the flushing foam 52. The controller 100 performs a control of causing the head 42 to discharge the ink(s) in an amount, which is suitable for the flushing processing, from the plurality of nozzles 44. The flushing foam 52 accommodated in the flushing box 51 absorbs the ink(s) discharged from the plurality of nozzles 44 of the head 42 by the flushing processing.

Since the flushing foam 52 is impregnated with the cleaning liquid L, the ink(s) absorbed by the flushing foam 52 moves downwardly, together with the cleaning liquid L, in the inside of the flushing foam 52, and reaches the space 75 defined at the location below the bottom surface of the flushing foam 52.

The controller 100 drives the pump driving motor 115 (see FIG. 3) while performing the flushing processing or after performing the flushing processing to thereby operate or drive the pump 122. The pump 122 applies a negative pressure to the space 75. Accordingly, the ink and the cleaning liquid L in the inside of the flushing foam 52 are sucked and move quickly downward, and the ink and the cleaning liquid L which have reached the space 75 are sucked and moved to the waste liquid tank 124.

Effects of the Embodiments

As described above, the maintenance apparatus 50 according to the present embodiment includes: the flushing foam 52 configured to absorb the liquid(s) discharged from the plurality of nozzles 44 of the head 42; and the flushing box 51 which does not have any upper surface (that is, opened upwardly) and which is configured to accommodate the flushing foam 52. The inner bottom surface of the flushing box 51 has the rib 71 being annular which supports the bottom surface of the flushing foam 52; the space 75 is defined by the bottom surface of the flushing foam 52, the rib 71 and the part of the inner bottom surface of the flushing box 51.

According to the maintenance apparatus 50 according to the present embodiment, by supporting the bottom surface of the flushing foam 52 with the rib 71 being annular, the ink(s) absorbed by the flushing foam 52 moves into the space 75. Therefore, it is possible to reduce solidifying of the ink in the inside of the flushing foam 52. The same effect can be achieved also by the printer 10 according to the present embodiment.

Further, the maintenance apparatus 50 is further provided with the pump 122 fluidly connected to the space 75. The pump 122 applies the negative pressure to the space 75, thereby causing the ink absorbed by the flushing foam 52 to move into the space 75 in a short time. Thus, it is possible to reduce solidifying of the ink in the inside of the flushing foam 52. Further, the space 75 is an enclosed (sealed) space. Therefore, by applying the negative pressure to the space 75, which is the enclosed space, by the pump 122, the ink absorbed in the flushing foam 52 moves into the space 75 in a short time.

Furthermore, the inner bottom surface of the flushing box 51 has a recessed part 72 at a lower position in a gravity direction of an area surrounded by the rib 71 being annular, a cross sectional area of the recessed part 72 orthogonal to the gravity direction decreasing as a position at which the cross-sectional area is taken shifts downward in the gravity direction. Thus, the ink(s) absorbed by the flushing foam 52 can be collected into the recessed part 72 within the space 75. The rib 71 has the planar shape capable of surrounding all the plurality of nozzles 44 of the head 42. Accordingly, it is possible to correct the inks discharged from all of the plurality of nozzles 44 of the head 42 into the space 75.

Further, the maintenance apparatus 50 is further provided with the plate member 53 which presses the flushing foam 52 and covers the upper part of the flushing box 51. The plate member 53 has the opening 58 which exposes the part of the upper surface of the flushing foam 52, and the rib 71 is located below the position, in the plate member 53, which is different from the position at which the opening 58 is located. Thus, it is possible to reduce any twisting of the flushing foam 52 pressed by the plate member 53.

Furthermore, at least one of the inner side surfaces of the flushing box 51 has ribs which are included in the plurality of ribs **66*a* to 66*d* which make contact with the side surface(s) of the flushing foam 52. Accordingly, the part storing the cleaning liquid, etc., is formed, with the plurality of ribs 66*a* to 66*d*, in the outer periphery of the internal space of the flushing box 51, thereby making it possible to supply the cleaning liquid, etc., to the flushing foam 52. Moreover, the rib 71 and each of the ribs 66*a* to 66*d* are positioned apart from one another. Therefore, it is possible to reduce stagnation or blocking of the flow of the cleaning liquid, etc., stored in the flushing box 51**.

Further, the maintenance apparatus 50 is further provided with: the storing tank 54 which is adjacent to the flushing box 51 and which is configured to store the cleaning liquid; the wiper unit 55 having the wipers 56 and 57, and rotatable, with the rotation shaft 59 as the center of rotation, to the downward position at which the wipers 56, 57 are immersed in the cleaning liquid stored in the storing tank 54 and to the upward position at which the wipers 56, 57 are not immersed in the cleaning liquid stored in the storing tank 54; and the partition 65 which partitions the flushing box 51 and the storing tank 54 from each other. The height of the partition 65 is equal to the heights of the forward end parts of the wipers 56, 57 in a case that the wiper unit 55 is located at the downward position. Thus, it is possible to supply the cleaning liquid from the storing tank 54 in a suitable amount to the flushing box 51.

Furthermore, the rotation shaft 59 of the wiper unit 55 is located at the position higher than the partition 65. Therefore, there is no need to seal the rotation shaft 59 of the wiper unit 55. Moreover, the height of the partition 65 is higher than the height of the rib 71. Therefore, it is possible to reduce mixing of the inks and the cleaning liquid in the inside of the rib 71 with the cleaning liquid supplied from the storage tank 54 and/or to reduce contamination of the cleaning liquid in the storage tank 54 by the ink. Further, the surface, of the partition 65, on the side of the flushing foam 52 has the ribs 67*a*, 67*b* which make contact with the side surface of the flushing foam 52. Accordingly, it is possible to reduce stagnation or blocking of the flow of the cleaning liquid, etc., stored in the flushing box 51.

Further, the flushing box 51 and the storage tank 54 are adjacent to each other with the partition 65 extending in the front-rear direction 8 being intervened therebetween; the central part in the front-rear direction 8 of the partition 65 is lower than the both ends parts in the front-rear direction 8 of the partition 65, and the size in the front-rear direction 8 of the central part of the partition 65 is greater than the size in the front-rear direction 8 of the flushing foam 52. Therefore, it is possible to supply a sufficient amount of cleaning liquid from the storage tank 54 to the flushing box 51.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

[Modifications]

Various modifications can be configured for the maintenance apparatus 50 according to the present embodiment. The maintenance apparatus 50 is provided with the pump 122 fluidly connected to the space 75. Regarding the maintenance apparatus according to a modification, it is not necessarily indispensable that the maintenance apparatus 50 is provided with the pump 122 in order to discharge the ink(s) and the cleaning liquid from the space 75. Further, in the maintenance apparatus 50, the space 75 is made to be the enclosed space. In the maintenance apparatus according to a modification, it is not necessarily indispensable that the space defined by the bottom surface of the flushing foam 52, the rib 71 and the part of the inner bottom surface of the flushing box 51 has a sealing property to such an extent that the space is considered to be an enclosed (sealed) space.

In the maintenance apparatus 50, the inner bottom surface of the flushing box 51 has one piece of the recessed part 72 in the inside of the position of the rib 71. In the maintenance apparatus according to a modification, the inner bottom surface of the flushing box 51 may have two or more pieces of the recessed part 72 in the inside of the position of the rib 71.

In the maintenance apparatus 50, the rib 71 is annular and the planar shape of the rib 71 is substantially rectangular (see a rib 71*a* depicted in FIG. 10A). The shape of the rib 71 is not limited to or restricted by this. In the maintenance apparatus according to a modification, the rib 71 may, for example, have a planar shape depicted in each of FIGS. 10B to 10F.

Figure 10B:
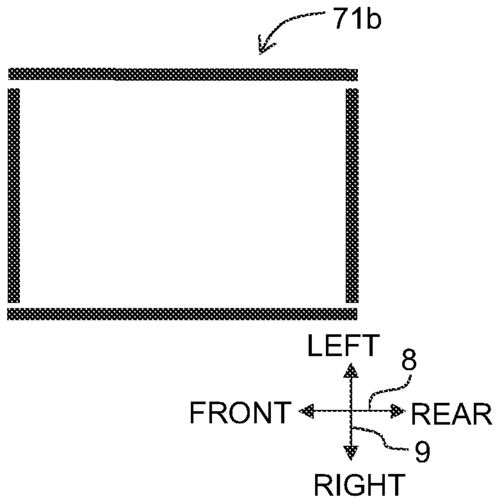
Figure 10C:
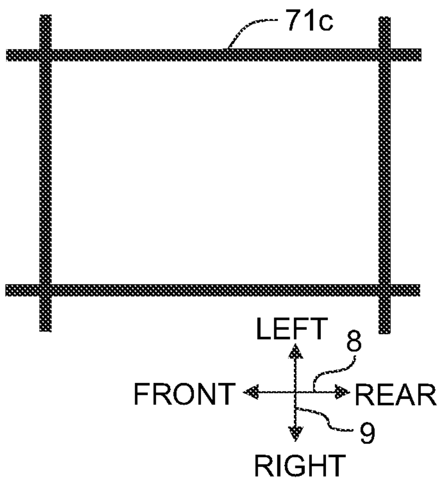
Figure 10D:
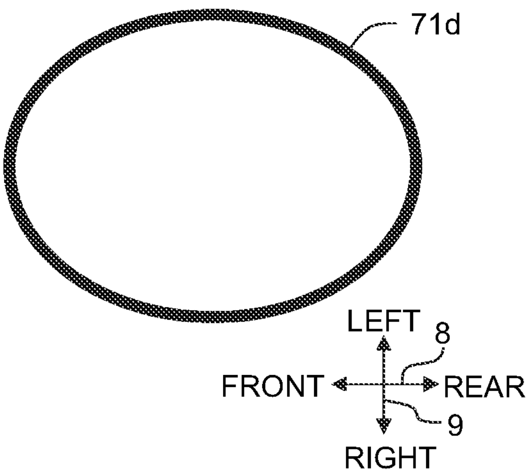
Figure 10E:
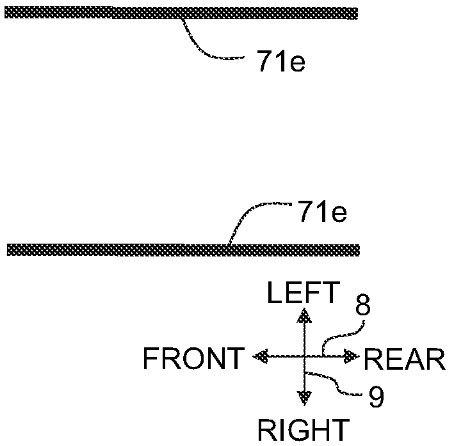
Figure 10F:
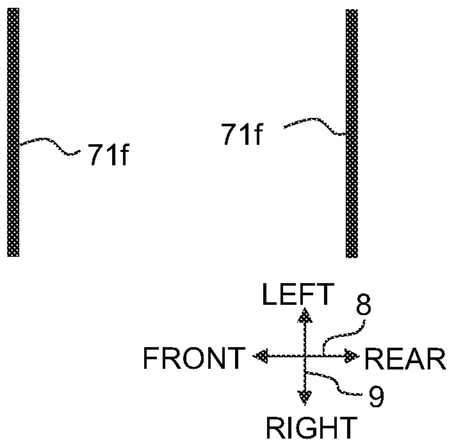

A rib 71*b* depicted in FIG. 10B is substantially rectangular and has a planar shape with gaps, respectively, in four corners. The size of each of the gaps is set, for example, so that each of the gaps is filled by the surface tension of the ink. The rib 71*b* configured in this manner can be considered to be an annular rib. A rib 71*c* depicted in FIG. 10C and a rib 71*d* depicted in FIG. 10D are each an annular rib. The planar shape of rib 71*c* is a shape of symbol "#(sharp)" (is #-shaped (sharp-shaped); a shape in which four sides of a rectangular are extended by a predetermined amount). The planar shape of rib 71*d* is elliptical. A rib 71*e* depicted in FIG. 10E and a rib 71*f* depicted in FIG. 10F do not have annular shape; rather, each of the ribs 71*e* and 71*f* has such a shape constructed of two parts. The planar shape of the rib 71*e* is two straight lines extending in the front-rear direction 8. The planar shape of the rib 71*f* is two straight lines extending in the left-right direction 9.

In view of the capability of supporting the bottom surface of the flushing foam 52 and defining the space at the location below the flushing foam 52, the maintenance apparatus according to a modification may have, as the rib 71, any of the ribs 71*a* to 71*f*. Note, however, that in view of the capability of defining the enclosed space at the location below the flushing foam 52, the rib 71 may be the ribs 71*a* to 71*d* being annular. Further, in view of the capability of defining the enclosed space at the location below the flushing foam 52 and surrounding all the plurality of nozzles 44 of the head 42 effectively, the rib 71 may be the rib 71*a* which is annular and of which planar shape is rectangular.

Further, projection(s) having a pin-like shape, a columnar shape, etc., may be arranged in the inner bottom surface of the flushing box 51, instead of the rib 71 or in addition to the rib 71. The projection may be a plurality of projections arranged, for example, so as to support the four corners of the bottom surface of the flushing foam 52. Alternatively, the projection may be a plurality of projections arranged in a matrix-like form so as to support the entire area of the bottom surface of the flushing foam 52. Also in a case of supporting the bottom surface of the flushing foam 52 with the above-described projections, the bottom surface of the flushing foam 52 is positioned apart or separated from the inner bottom surface of the flushing box 51 and a space is formed or defined below the flushing foam 52. The rib 71 and the projections having the pin-like shape, the columnar shape, etc., are collectively referred to as a "projection".

The maintenance apparatus 50 is provided with the plate member 53 which presses the flushing foam 52 and which covers the upper part of the flushing box 51. The maintenance apparatus according to a modification may not have a member covering the upper part of the flushing box, or the member covering the upper part of the flushing box may be formed of a wire material or a mesh (net) material, rather than the plate member 53 having the opening 58.

The maintenance apparatus 50 is configured so that the front wall 62 and the rear wall 64 of the flushing box 51 are each have the two ribs 66. In the maintenance apparatus according to a modification, at least one of the inner side surfaces of the flushing box 51 may have a plurality of ribs making contact with a side surface of the flushing foam 52.

In the maintenance apparatus 50, the flushing box 51 and the storage tank 54 are integrally formed. In the maintenance apparatus according to a modification, the flushing box 51 and the storage tank 54 may be formed separately. The maintenance apparatus according to a modification may not have the elements for the wiping processing (the storage tank 54, the wiper unit 55, and the wipers 56, 57). In this case, the maintenance apparatus according to the modification may have a supplying part configured to supply the cleaning liquid to the flushing box 51, not via the storage tank 54.

In the maintenance apparatus 50, the wiper unit 55 is configured to have the two wipers 56, 57. In the maintenance apparatus according to a modification, the wiper unit 55 may have 1 (one) piece or 3 (three) or more pieces of the wiper. In the maintenance apparatus 50, the height of the partition 65 is made to be equal to the height of the forward end part of each of the wipers 55, 56 in a case that the wiper unit 55 is located at the downward position. In the maintenance apparatus according to a modification, the height of the partition 65 may be higher than, or lower than, the height of the forward end part of each of the wipers 56, 57 in a case that the wiper unit 55 is located at the downward position.

In the maintenance apparatus 50, the size in the front-rear direction 8 of the central part of the partition 65 is made to be greater than the size in the front-rear direction 8 of the flushing foam 52. In the maintenance apparatus according to a modification, the size in the front-rear direction 8 of the central part of the partition 65 may be smaller than the size in the front-rear direction 8 of the flushing foam 52.

What is claimed is:

1. A maintenance apparatus for an image recording apparatus provided with a head having a nozzle configured to discharge a liquid, the maintenance apparatus comprising:

a foam configured to absorb the liquid discharged from the nozzle;

an accommodating box which is opened upwardly and which accommodates the foam; and a plate pressing the foam and covering an upper part of the accommodating box, wherein:

an inner bottom surface of the accommodating box has a rib supporting a bottom surface of the foam so that the bottom surface of the foam is positioned separated from the inner bottom surface of the accommodating box;

the plate has an opening exposing a part of an upper surface of the foam; and the rib is positioned below a position, in the plate, different from the opening of the plate.

2. An image recording apparatus comprising:

a head having a nozzle configured to discharge a liquid;

a carriage mounting the head and configured to move; and the maintenance apparatus as defined in claim 1.

3. A maintenance apparatus for an image recording apparatus provided with a head having a nozzle configured to discharge a liquid, the maintenance apparatus comprising:

a foam configured to absorb the liquid discharged from the nozzle;

an accommodating box which is opened upwardly and which accommodates the foam;

a storage tank which is adjacent to the accommodating box and which is configured to store a cleaning liquid;

a wiper unit which has a wiper and which is configured to rotate about a rotation shaft to a first position at which the wiper is immersed in the cleaning liquid stored in the storage tank and to a second position at which the wiper is not immersed in the cleaning liquid; and a partition separating the accommodating box and the storage tank from each other, wherein:

an inner bottom surface of the accommodating box has a projection supporting a bottom surface of the foam so that the bottom surface of the foam is positioned separated from the inner bottom surface of the accommodating box, and a height of the partition is equal to a height of a forward end of the wiper in a case that the wiper unit is located at the first position.

4. The maintenance apparatus according to claim 3, wherein the rotation shaft of the wiper unit is located at a position higher than the partition.

5. The maintenance apparatus according to claim 3, wherein the height of the partition is higher than a height of the projection.

6. The maintenance apparatus according to claim 3, wherein a surface, of the partition, facing the foam has a rib making contact with a side surface of the foam.

7. The maintenance apparatus according to claim 3, wherein the accommodating box and the storing tank are adjacent to each other, with the partition extending in a first direction being interposed between the accommodating box and the storing tank;

a height of a central part in the first direction of the partition is lower than heights of both end parts in the first direction of the partition; and a size in the first direction of the central part is greater than a size in the first direction of the foam.

8. An image recording apparatus comprising:

a head having a nozzle configured to discharge a liquid;

a carriage mounting the head and configured to move; and the maintenance apparatus as defined in claim 3.

* * * * *